(12) United States Patent
Das et al.

(10) Patent No.: US 9,450,409 B2
(45) Date of Patent: Sep. 20, 2016

(54) CONVERTER STATION POWER SET POINT ANALYSIS SYSTEM AND METHOD

(71) Applicant: ABB Research Ltd., Zurich (CH)

(72) Inventors: Debrup Das, Raleigh, NC (US); Reynaldo Nuqui, Cary, NC (US); Mats Larsson, Baden-Dättwil (CH)

(73) Assignee: ABB Research Ltd., Zurich (CH)

( * ) Notice: Subject to any disclaimer, the term of this patent is extended or adjusted under 35 U.S.C. 154(b) by 391 days.

(21) Appl. No.: 13/922,644

(22) Filed: Jun. 20, 2013

(65) Prior Publication Data

US 2014/0379157 A1 Dec. 25, 2014

(51) Int. Cl.
| | | |
|---|---|---|
| *G06F 1/32* | (2006.01) | |
| *H02J 3/14* | (2006.01) | |
| *H02J 3/34* | (2006.01) | |
| *H02J 3/38* | (2006.01) | |
| *H02J 3/36* | (2006.01) | |

(52) U.S. Cl.
CPC .. *H02J 3/14* (2013.01); *H02J 3/34* (2013.01); *H02J 3/38* (2013.01); *G06F 1/3203* (2013.01); *H02J 3/36* (2013.01); *Y02E 60/60* (2013.01)

(58) Field of Classification Search
CPC ........................................................ H02J 3/14
USPC ........................................ 700/295; 713/323
See application file for complete search history.

(56) References Cited

U.S. PATENT DOCUMENTS

| 8,170,723 | B2 | 5/2012 | Berggren et al. | |
|---|---|---|---|---|
| 2004/0158417 | A1* | 8/2004 | Bonet | ............................. 702/57 |
| 2007/0250217 | A1 | 10/2007 | Yoon et al. | |
| 2008/0150283 | A1* | 6/2008 | Rivas | ................... H02J 3/1885 290/44 |
| 2008/0262820 | A1* | 10/2008 | Nasle | ............................. 703/18 |

(Continued)

FOREIGN PATENT DOCUMENTS

| CA | 2666743 A1 | 7/2010 |
|---|---|---|
| WO | 2008025162 A1 | 3/2008 |

OTHER PUBLICATIONS

Das, D. et al., "Increasing Inter-Area Available Transfer Capacity using Controllable Network Transformers", 2010 IEEE Energy Conversion Congress and Exposition (ECCE), Atlanta, Georgia, Sep. 12-16, 2010, pp. 3618-3625.

(Continued)

*Primary Examiner* — Thomas Lee
*Assistant Examiner* — Volvick Derose
(74) *Attorney, Agent, or Firm* — Taft Stettinius & Hollister LLP

(57) ABSTRACT

Converter stations have real and reactive power set points initially determined as part of a main loadflow analysis routinely performed on the AC power system connected to the converter stations. Viable real and/or reactive power set points for the converter stations can be identified by calculating real and/or reactive power set point candidates for the converter stations before the main loadflow analysis is performed again on the AC power system. The power set point candidates are calculated based on information determined as part of a previous iteration of the main loadflow analysis on the AC power system. The power set point candidates which violate an operating constraint imposed on the AC power system are identified, and a region of valid power set points is defined for the converter stations that excludes the power set point candidates which violate an operating constraint imposed on the AC power system.

24 Claims, 16 Drawing Sheets

(56) References Cited

U.S. PATENT DOCUMENTS

| | | | |
|---|---|---|---|
| 2008/0281474 A1* | 11/2008 | Patel | 700/298 |
| 2010/0106338 A1* | 4/2010 | Nam et al. | 700/292 |
| 2010/0145533 A1* | 6/2010 | Cardinal | H02J 3/383 700/291 |
| 2010/0298996 A1* | 11/2010 | Gadinger et al. | 700/291 |
| 2011/0064573 A1* | 3/2011 | Viripullan | F03D 7/024 416/1 |
| 2011/0095532 A1* | 4/2011 | Schubert et al. | 290/44 |
| 2011/0156389 A1* | 6/2011 | Arlaban Gabeiras | F03D 9/005 290/44 |
| 2011/0175353 A1* | 7/2011 | Egedal | F03D 7/028 290/44 |
| 2011/0251732 A1* | 10/2011 | Schweitzer, III | H02J 3/12 700/297 |
| 2011/0301769 A1* | 12/2011 | Lovmand | F03D 7/028 700/287 |
| 2012/0089264 A1* | 4/2012 | Patel | H02J 3/00 700/292 |
| 2012/0091817 A1* | 4/2012 | Seymour | H02J 3/383 307/82 |
| 2012/0191440 A1* | 7/2012 | Meagher et al. | 703/18 |
| 2013/0169241 A1* | 7/2013 | Garc A Sayes | H02P 9/48 322/20 |
| 2013/0277969 A1* | 10/2013 | Nielsen | H02J 3/386 290/44 |
| 2014/0046500 A1* | 2/2014 | Varma | 700/298 |
| 2014/0062085 A1* | 3/2014 | Larsen | F03D 9/005 290/44 |

OTHER PUBLICATIONS

Liu, C.-W. et al., "Application of Synchronised Phasor Measurements to Real-Time Transient Stability Prediction", IEE Proceedings—Generation, Transmission and Distribution, vol. 142, Issue 4, Jul. 1995, pp. 355-360.

\* cited by examiner

CONVERTER STATION POWER SET POINT ANALYSIS SYSTEM AND METHOD

TECHNICAL FIELD

The instant application relates to converter stations, and more particularly to power set point analysis for converter stations.

BACKGROUND

HVDC power systems are connected to AC networks by converter stations which convert between DC on the HVDC side and AC on the AC network side. SCADA (supervisory control and data acquisition) is a type of computer-controlled industrial control system that monitors and controls operation of such an integrated HVDC/AC network. SCADA typically runs programs such as OPF (optimal power flow) and provides each of the converter stations a P-Q (real and reactive power) set point once every five to fifteen minutes. An HLC (high level controller) which controls operation of the HVDC system may communicate and provide new set points to the converter stations more frequently than the SCADA system performs OPF, e.g. every 1-60 seconds. As such the HLC can change the P-Q set points of the converter stations during this inter-OPF period. However, the HLC must ensure that the new P-Q set points do not compromise the security or reliability of the AC networks. Otherwise, faults or other undesirable conditions or actions may occur in the AC networks. For example, bus voltage limits, line current limits and/or line thermal limits may be exceeded in the AC networks in response to particular changes in the P-Q set points of the converter stations.

SUMMARY

According to the exemplary embodiments described herein, a methodology is provided for determining viable changes in the real and/or reactive power set points of converter stations without compromising the security or reliability of the AC power system connected to the converter stations.

According to an embodiment of a method of identifying viable real and/or reactive power set points for converter stations connecting a first power system to an AC second power system, the converter stations each have a real and reactive power set point initially determined as part of a main loadflow analysis routinely performed on the AC power system. The method comprises: calculating real and/or reactive power set point candidates for the converter stations before the main loadflow analysis is performed again on the AC power system, the power set point candidates calculated based on information determined as part of a previous iteration of the main loadflow analysis on the AC power system; identifying which of the power set point candidates violate an operating constraint imposed on the AC power system; and defining a region of valid power set points for the converter stations that excludes the power set point candidates which violate an operating constraint imposed on the AC power system.

According to a corresponding power flow analysis system for identifying viable real and/or reactive power set points for the converter stations, the power flow analysis system comprises a processing circuit operable to calculate real and/or reactive power set point candidates for the converter stations before the main loadflow analysis is performed again on the AC power system. The processing circuit is further operable to identify which of the power set point candidates violate an operating constraint imposed on the AC power system and define a region of valid power set points for the converter stations that excludes the power set point candidates which violate an operating constraint imposed on the AC power system.

According to an embodiment of a corresponding non-transitory computer readable medium storing a computer program operable to identify viable real and/or reactive power set points for the converter stations, the computer program comprises: program instructions to calculate real and/or reactive power set point candidates for the converter stations before the main loadflow analysis is performed again on the AC power system; program instructions to identify which of the power set point candidates violate an operating constraint imposed on the AC power system; and program instructions to define a region of valid power set points for the converter stations that excludes the power set point candidates which violate an operating constraint imposed on the AC power system.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

According to the exemplary embodiments described herein, limits on real (P) and/or reactive (Q) power set points of converter stations connected to an AC power system are determined between periodic loadflow analyses performed on the AC power system connected to the converter stations. In this way power flow can be better optimized without waiting for another loadflow analysis to be performed on the AC power system, which is typically performed every five to fifteen minutes. The methodology described herein takes as input various static and dynamic system data such as network topology, line status, set operating points of generators, etc., and determines the limits on the real and/or reactive power at each converter station. Repeated power flow simulations and search techniques are employed to derive a multi-dimensional space that contains a valid operational region for the real and/or reactive power transfer between the parts of the integrated system at the points of connection i.e. at the converter stations. The newly determined limits of real and/or reactive power can be used to change the power set points of the converter stations in order to achieve one or more control objectives without compromising the security or reliability of the integrated system, and without waiting for another loadflow analysis to be performed on the power system. The converter station power set point analysis embodiments described herein can be applied to HVDC system that are connected to one or more AC power systems by converter stations. In a broad sense, the converter station power set point analysis embodiments described herein can be applied to any kind of converter station device capable of tracking active and reactive power references. For example, this includes HVDC converter stations in point-to-point schemes, but could also be used to compute an allowable range for the power injections from e.g. intermittent power sources such as wind or solar power installations connected through converter stations. In yet another embodiment, the converter station power set point analysis embodiments described herein can be used to define an allowable range of tie-line flows into or out of an external system to be used by automatic generation control (AGC).

Figure 1:
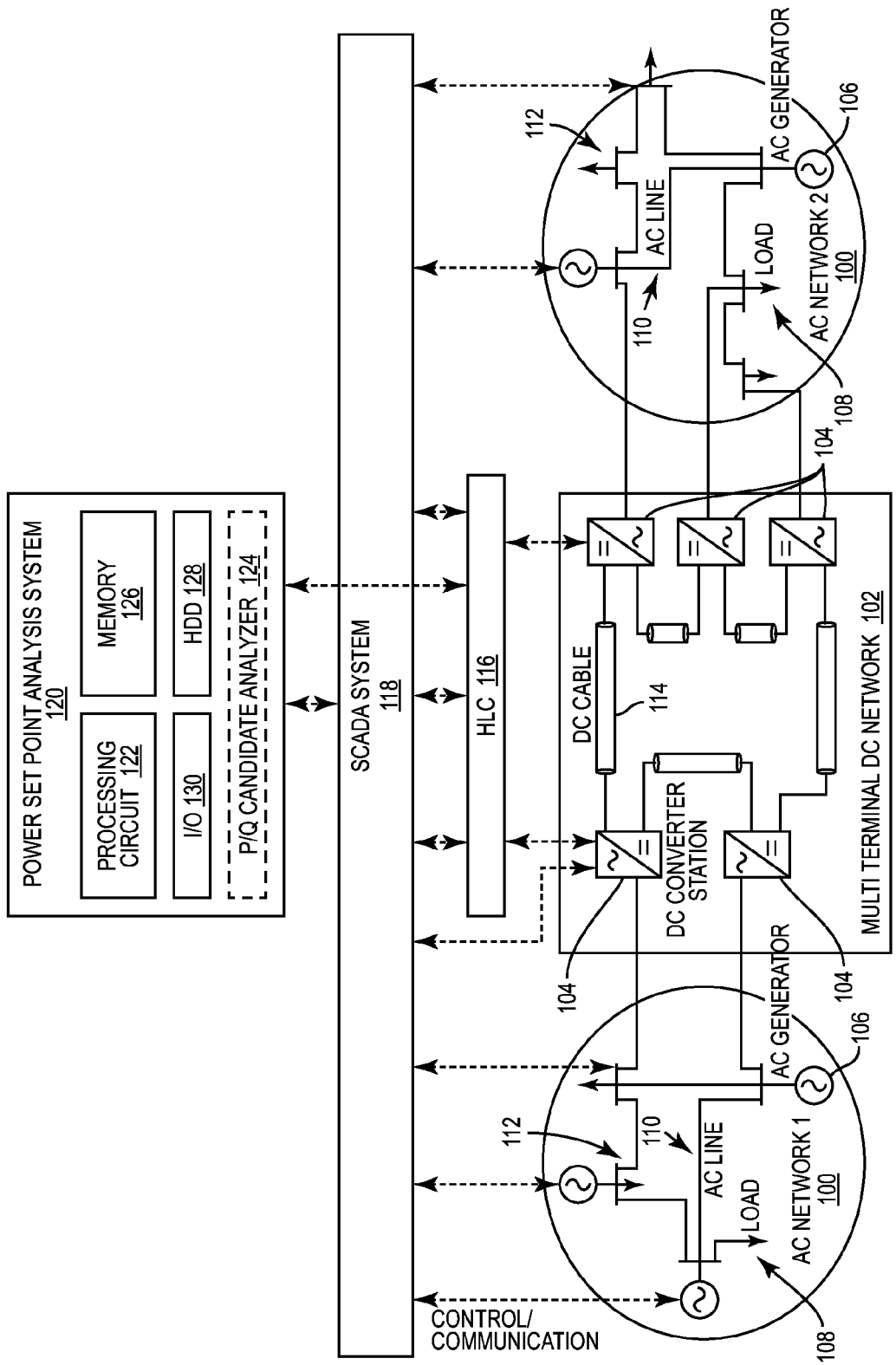
FIG. 1 illustrates a block diagram of an embodiment of an integrated AC-DC system with a power set point analysis system and an AC power system connected to an HVDC power system.

FIG. 1 illustrates an embodiment of an integrated AC-DC system implemented as an MTDC-AC (multi-terminal DC-AC) system with an AC power system including one or more AC networks 100 such as AC grids connected to an HVDC system 102 by converter stations 104. Each AC network 100 includes various components such as AC generators 106, loads 108, AC lines 110, buses 112, rectifiers, protective devices, etc., some of which are not shown in FIG. 1 for ease of illustration. According to the embodiment of FIG. 1, the HVDC system 102 is an MTDC (multi-terminal DC) network which includes the converter stations 104 for connecting the AC networks 100 to a DC grid which is part of the MTDC network 102. The DC grid includes various components such as DC cables 114, DC-to-DC converters, etc., some of which are not shown in FIG. 1 for ease of illustration. The HVDC system 102 is multi-terminal according to this embodiment in that the HVDC system 102 has at least three converter stations 104 for interfacing the AC networks 100 to the DC grid.

In general the converter stations 104 can be voltage or current source converters having real (P) and reactive (Q) power set points determined by an HLC (high level controller) 116 included in or associated with the HVDC system 102. Each converter station 104 is a type of substation which forms the terminal equipment for a HVDC transmission line, and converts DC to AC or the reverse. Besides the converter itself, the station 104 typically contains three-phase AC switch gear, transformers, capacitors or synchronous condensers for reactive power, filters for harmonic suppression, direct current switch gear, etc., none of which are shown in FIG. 1.

Two AC networks 100 and one MTDC network 102 with five converter stations 104 are shown in FIG. 1, but in general any number of AC and DC networks 100, 102 can form the integrated AC-DC system. Also the AC networks 100 may be connected together with other AC or DC lines apart from the MTDC connections.

Figure 2:
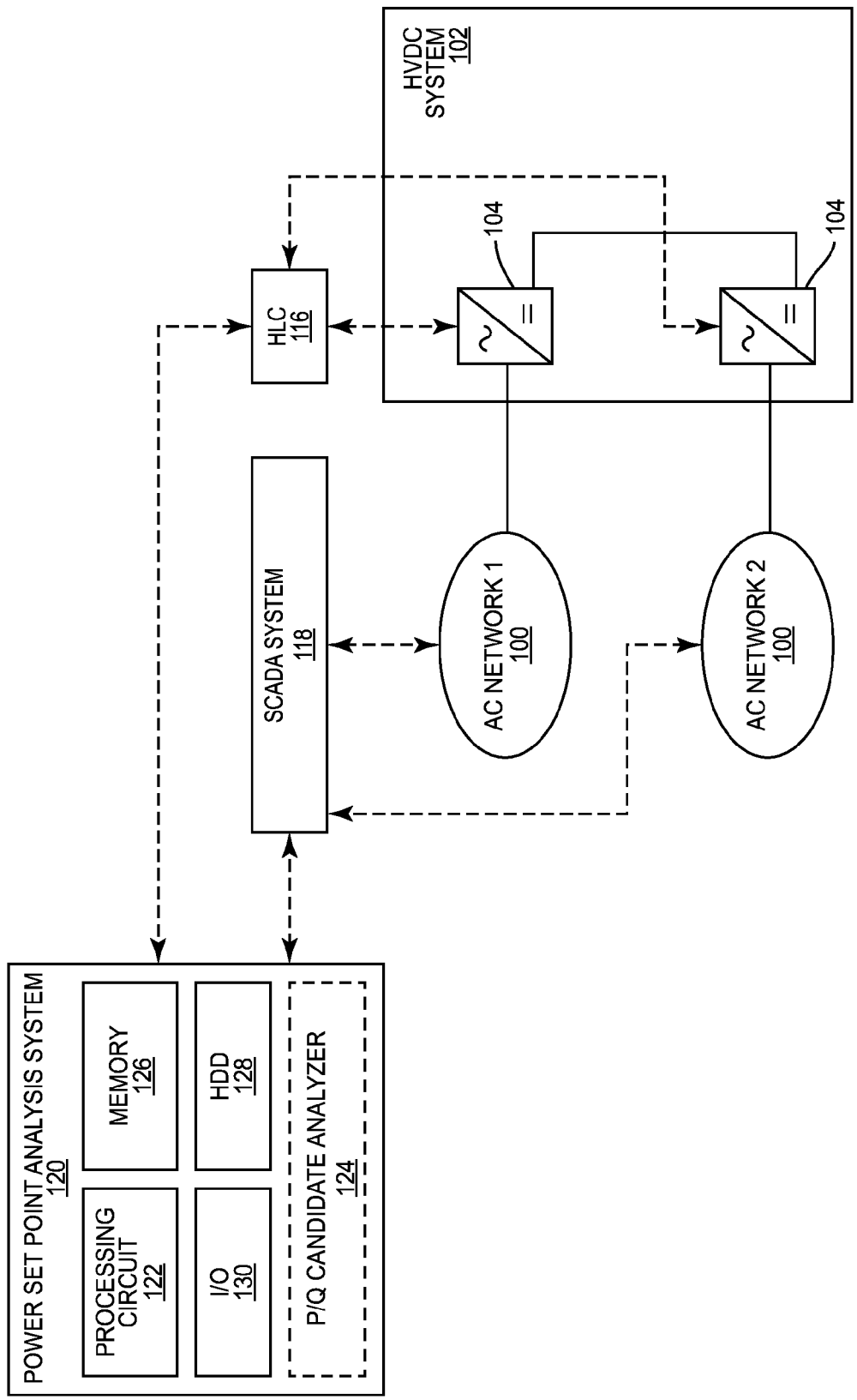
FIG. 2 illustrates a block diagram of another embodiment of an integrated AC-DC system with a power set point analysis system and AC grids connected to an HVDC system.

FIG. 2 illustrates another embodiment of an integrated AC-DC system which also includes AC networks 100 connected to an HVDC system 102 by converter stations 104. Different from the embodiment of FIG. 1, the HVDC system 102 shown in FIG. 2 does not include a DC grid. Instead, a pair of converter stations 104 is provided for connecting two different AC networks 100 over long distances. More than two AC networks 100 can be connected in this way by the HVDC system 102 e.g. by connecting various AC networks 100 across different regions of a country, between countries or across continents.

According to both embodiments of FIGS. 1 and 2, a SCADA system 118 monitors and controls operation of the integrated AC-DC system. For example, a SCADA system can be provided for each AC network 100 included in the integrated AC-DC system. Alternatively, a single SCADA system can be provided for all of the AC networks 100 included in the integrated AC-DC system. In this case, the HVDC system 102 can be contained fully within the AC network 100. The term 'SCADA system' as used herein is intended to cover both scenarios i.e. by referring to a single SCADA system for the entire integrated AC-DC system or individual SCADA systems for each AC network.

The SCADA system 100 periodically executes a main loadflow analysis program such as OPF (optimal power flow) on the AC power system to determine operating conditions of the integrated AC-DC system. The operating conditions determined by the main loadflow analysis program can include bus voltages, branch power factors, currents, power flows throughout the integrated AC-DC system, etc. The power flows determined by the SCADA system 118 include real and reactive power (P-Q) set points for the converter stations 104 of the HVDC system 102. The SCADA system 100 periodically performs the main loadflow analysis e.g. once every five to fifteen minutes. Any standard loadflow analysis program can be implemented by the SCADA system 118 to set the operating conditions of the integrated AC-DC system, and therefore no further explanation is given in this regard.

Between periodic main loadflow analyses performed by the SCADA system 100, the real and/or reactive power (P/Q) set points of the converter stations 104 are revisited to determine whether the set points should be changed before the main loadflow analysis is performed again. To this end, a power set point analysis system 120 is provided as part of the integrated AC-DC system. Computer programs executed by the power set point analysis system 120 to identify viable P/Q set point candidates for the converter stations 104 utilize information generated by the SCADA system 100. The P/Q set point candidates are 'viable' or 'good' in that the P/Q set points of the converter stations 104 can be changed to any of the corresponding candidates and still work or function without compromising the security or reliability of the integrated AC-DC system. The power set point analysis system 120 can be collocated with or integrated in the SCADA system 100. Alternatively, the power set point analysis system 120 can be located separate from the SCADA system 100 elsewhere in the integrated AC-DC system.

In general, the power set point analysis system 120 comprises a processing circuit 122 which can include digital and/or analog circuitry such as one or more controllers, processors, ASICs (application-specific integrated circuits), etc. for executing program code which identifies viable P/Q set point candidates for the converter stations 104. To this end, the power set point analysis system 120 includes a P/Q candidate analyzer 124 included in or associated with the processing circuit 122 for performing the converter station P/Q set point analysis techniques described herein. The power set point analysis system 120 also has a storage medium such as DRAM (dynamic random access memory) 126 and an HDD (hard disk drive) 128 for storing the program code and related data processed and accessed by the processing circuit 122 and P/Q candidate analyzer 126 during execution of program code. The storage medium also stores the results generated by the power set point analysis system 120.

The power set point analysis system 120 also has I/O (input/output) circuitry 130 for communicating with the SCADA system 118 and the HLC 116. For example, the power set point analysis system 120 can receive information from the SCADA system 100 which is determined as part of the main loadflow analysis performed on the AC power system via the I/O circuitry 130. The power set point analysis system 120 can also send a region R of valid P/Q set point candidates for the converter stations 104 to the HLC 114 for consideration via the I/O circuitry 130. This region R of valid P/Q set point candidates excludes those candidates determined by the power set point analysis system 120 to violate an operating constraint imposed on the AC power system, such as bus voltage limits, line current limits, line thermal limits, etc.

The HLC 116 can provide new P/Q set points to the converter stations 106 more frequently than the converter station set points are updated by the SCADA system 100 as part of the main loadflow analysis of the AC networks 100. For example, the HLC 116 can periodically provide new P/Q set points to the converter stations 104 every 1-60 seconds or at other periodic intervals, or in response to a triggering event such as a command received by the HLC 116 or an event within the HVDC system 102 detected by or indicated to the HLC 116. The HLC 116 can change the converter station P/Q set points to any combination of P/Q set points indicated as being valid by the power set point analysis system 120, before the main loadflow analysis is performed again on the AC power system.

Figure 3:
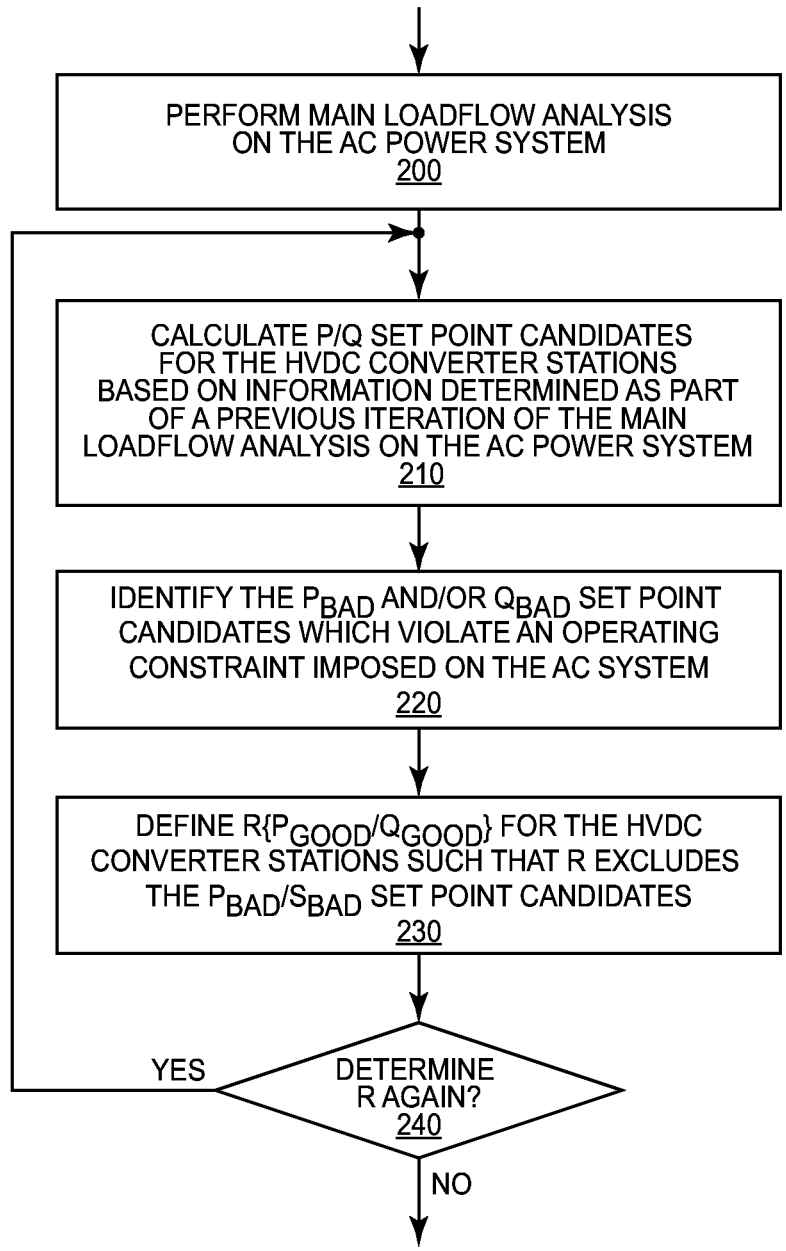
FIG. 3 illustrates a flow diagram of an embodiment of a method of identifying viable power set points for converter stations of an HVDC power system.

FIG. 3 illustrates an embodiment of the P/Q set point identification method implemented by the power set point analysis system 120. After the SCADA system 118 performs a main loadflow analysis on the AC power system (Block 200), the power set point analysis system 120 calculates real and/or reactive power (P/Q) set point candidates for the converter stations 104 before the main loadflow analysis is performed again on the AC power system (Block 210). The P/Q set point candidates are calculated by the power set point analysis system 120 based on information determined by the SCADA system 100 as part of a previous iteration of the main loadflow analysis on the AC power system. This information can include, but is not limited to, bus voltages, load power factors, currents, power flows throughout the integrated AC-DC system, etc. The power set point analysis system 120 also identifies which of the P/Q set point candidates ($P_{BAD}/Q_{BAD}$) violate an operating constraint imposed on the AC power system (Block 220). The operating constraint can include, but is not limited to, bus voltage limits, line current limits, line thermal limits, etc. The power set point analysis system 120 then defines a 'good region' R which contains only valid ones of the P/Q set point candidates ($P_{GOOD}/Q_{GOOD}$) for the converter stations 104 (Block 230).

The P/Q set point candidates $P_{BAD}/Q_{BAD}$ which violate one or more operating constraints imposed on the AC power system are excluded from the good region R so that $R\{P_{GOOD}, Q_{GOOD}\}$. Multiple loadflow simulations are performed on the HVDC system 102 to derive $R\{P_{GOOD}, Q_{GOOD}\}$. $R\{P_{GOOD}, Q_{GOOD}\}$ can be determined more than one time (by repeating Block 210 through Block 240) before the SCADA system 118 performs another iteration of the main loadflow analysis on the AC power system (Block 200). New P/Q set points are determined for the converter stations 104 as a result of the main loadflow analysis. The HLC 116 can change the P/Q set points of the converter stations 104 to any suitable combination of the P/Q set point candidates included in the good region R before the main loadflow analysis is performed again on the AC power system, without compromising the security or reliability of the integrated AC-DC system.

In general with regard to the HLC 116, mathematically the HLC 116 solves an optimization problem. Given a set of variables x, the objective is to minimize a cost function C(x), under constraints given by f(x)=0 and g(x)≤0. The variables x can be for example the real (P) and reactive (Q) power outputs of the various converter stations 104. The cost function may consist of one or more objectives such as minimization of line losses, maximization of power delivery from one or more AC networks 100, etc. The constraints f(x)=0 can be an energy balance equation (e.g. total energy delivered from an AC to a DC grid=total energy delivered from the DC grid to another AC grid+losses in the DC grid). The constraints g(x)≤0 can be used to check for violations in the DC grid, for example instantaneous power delivered by a converter station 104 must be lower than its VA (apparent power) rating.

The good region R provided from the power set point analysis system 120 to the HLC 116 can be described mathematically as a convex hull in one embodiment. The convex hull can be formulated by a set of inequality equations, of the form $g_1(x) \leq 0$. These constraints are added to the optimization problem solved by the HLC 116. For example, the HLC 116 can solve to minimize C(x) under constraints f(x)=0, g(x)≤0 and $g_1(x) \leq 0$.

Figure 4:
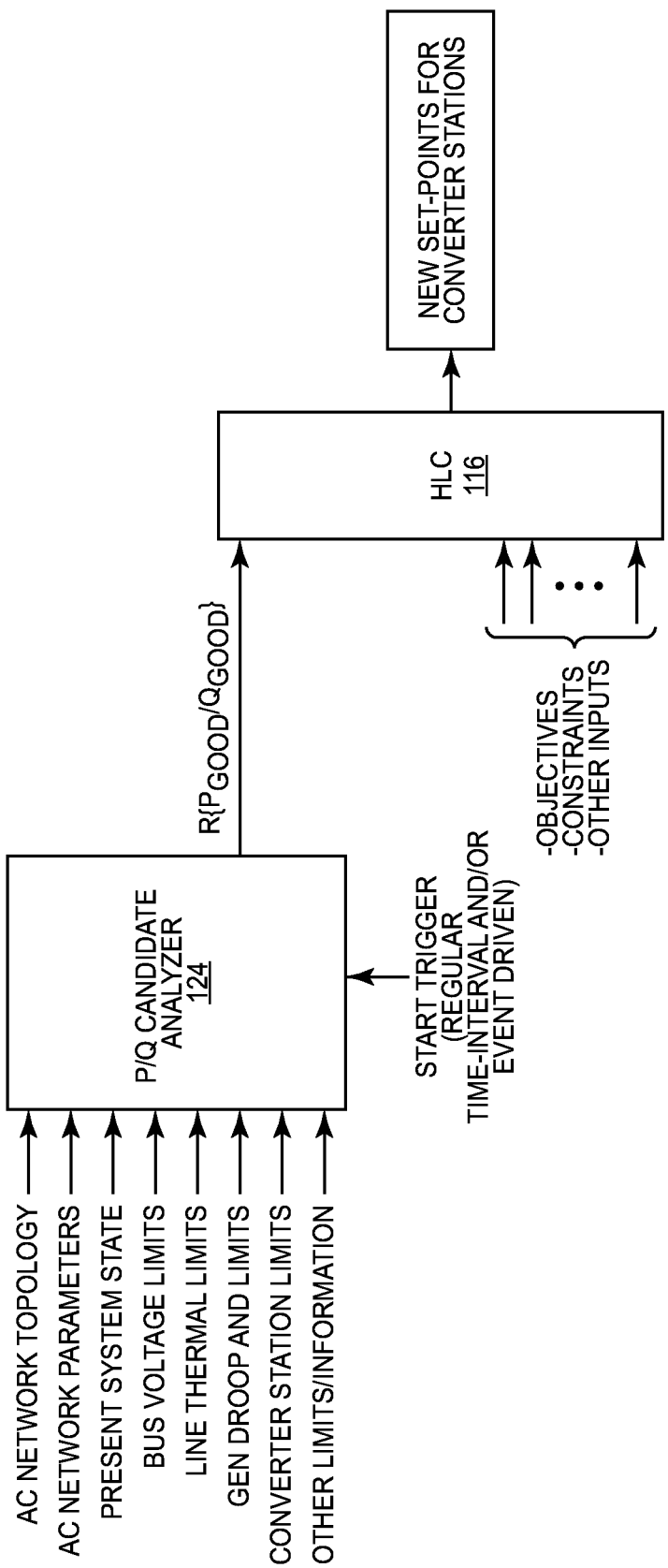
FIG. 4 illustrates a block diagram of an embodiment of a P/Q candidate analyzer included in or associated with a power set point analysis system.

FIG. 4 illustrates an embodiment of the P/Q candidate analyzer 124 that determines the good region R of P/Q set point candidates provided to the HLC 116. For N converter stations 104 located in the HVDC system 102 of FIG. 1 or 2, the present P-Q operating points of the N converter stations 104 are given by the vector $S=[P_1, Q_1, P_2, Q_2, \ldots, P_N, Q_N]$. The quantity $\Delta S=[\Delta P_1, \Delta Q_1, \Delta P_2,$ $\Delta Q_2, \ldots, \Delta P_N, \Delta Q_N]$ is defined as a change in the set point vector S. If the HLC 116 requests the change vector $\Delta S$, then the converter stations 104 can operate at a P-Q set point given by $S+\Delta S$. Hence under this condition, the P-Q set point of the $K^{th}$ converter station 104 is given by $P=P_K+\Delta P_K$ and $Q=Q_K+\Delta Q_K$. The P/Q candidate analyzer 124 finds the set of the possible change in P/Q set point vectors, $\Delta S_{GOOD}$, which does not violate any operational constraints of the AC networks 100. The resulting region R, in the 2N dimensional space, is referred to as a 'good region' if all the P/Q set point candidates contained within region R are valid points ($R\{P_{GOOD}/Q_{GOOD}\}$) i.e. none of the P/Q set point candidates contained within region R would compromise the security or reliability of the integrated AC-DC system if implemented at the corresponding converter stations 104. As such, the integrated AC-DC systems of FIG. 1 and FIG. 2 should be secure if the change vector commanded by the HLC 116 is equal to any P-Q set point candidate $\Delta S_A=[\Delta P_{A1}, \Delta Q_{A1}, \Delta P_{A2}, \Delta Q_{A2}, \ldots, \Delta P_{AN}, \Delta Q_{AN}]\in R$.

All P/Q set point candidates included in the good region R can be considered equally favorable. The good region R, containing many valid P/Q set point candidates, effectively serves as a region of backup states for the converter stations 104. The converter stations 104 can go to any of these backup states, as desired or required.

Figure 5:
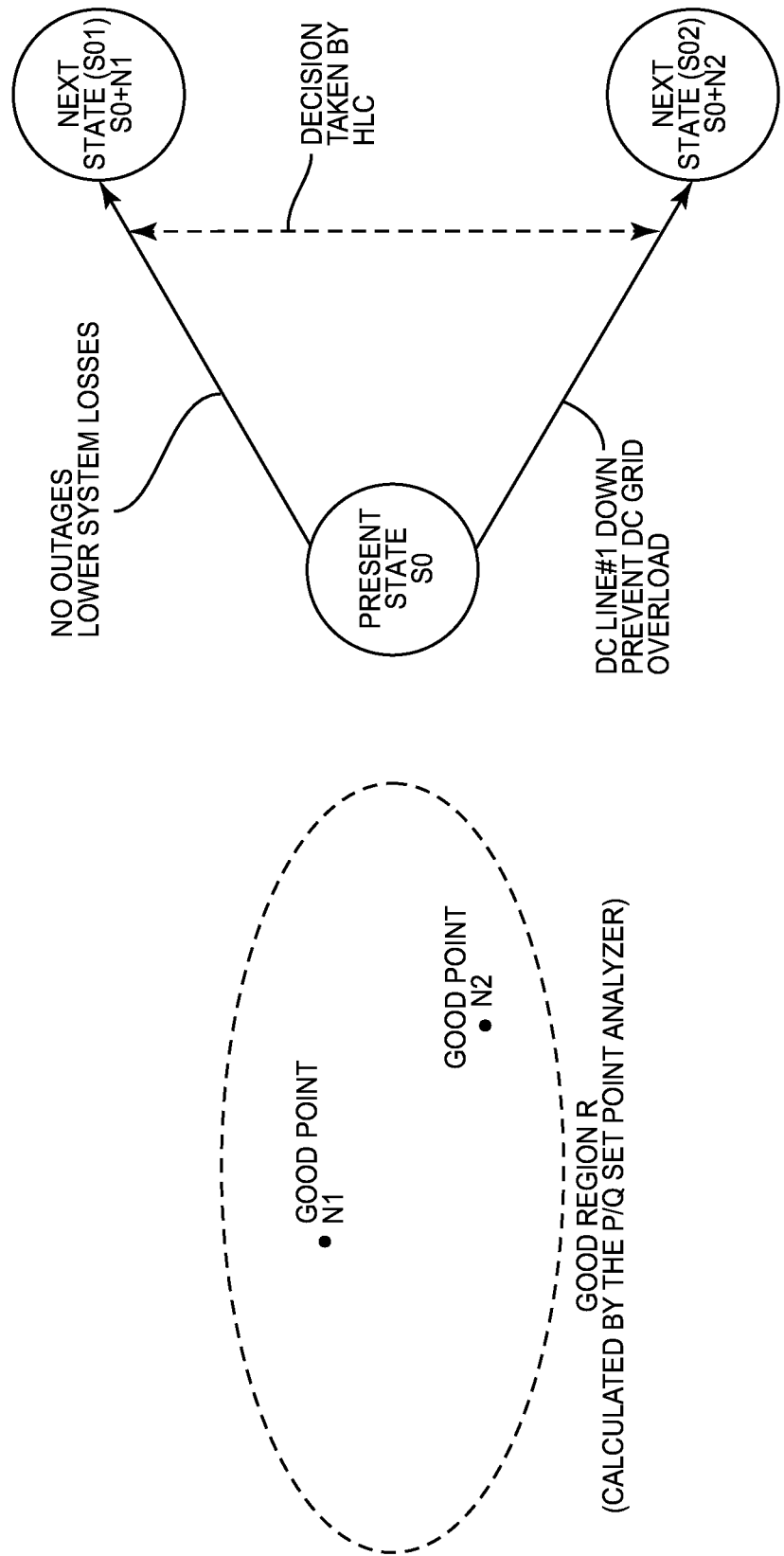
FIG. 5 illustrates a schematic diagram of an embodiment of a high level controller choosing the next state of a converter station from a good region of P/Q set point candidates.

FIG. 5 illustrates an embodiment of the decision process by the HLC 116 in choosing the next state of a converter station 104 from the good region R of P/Q set point candidates, based on a particular operating condition. For example, the HLC 116 can chose to move the converter station 104 from the present operating state (S0) to a different operating state (S01 or S02) depending on whether a DC line outage has occurred in the HVDC system 102. The good region R provided by the P/Q candidate analyzer 124 contains valid P/Q set point candidates N1 and N2 that can enable the shifting of the converter station 104 from the present state S0 to either state S01 or S02. If there are no DC line outages in the HVDC system 102, the HLC 116 can lower system losses by moving the converter station 104 from the present state S0 to state S01 where S01=S0+N1. If DC line #1 is down in the HVDC system 102, the HLC 116 can prevent DC grid overload by moving the converter station 104 from the present state S0 to state S02 where S02=S0+N2. Of course this example is overly simplified and purely exemplary, and can be readily expanded to include various converter stations 104, account for several operating considerations and provide many valid P/Q set point candidates in the good region R.

In general, the P/Q candidate analyzer 124 calculates the good region R which contains valid P/Q set point candidates for the converter stations 104 of the integrated AC-DC system. The P/Q candidate analyzer 124 can take as inputs various data, including but not limited to, network topology, present system state, bus voltage limits, line thermal limits, generator droop and limits, converter station limits, etc. This information can be provided by the SCADA system 118, and can be determined as part of the main loadflow analysis performed by the SCADA system 118 on the AC power system. The P/Q candidate analyzer 124 may be invoked by a regular timer (i.e. periodically) and/or by an event driven trigger. The good region R determined by the P/Q candidate analyzer 124 is passed to the HLC 116 which may use R for finding new set points for the converter stations 104 before the main loadflow analysis is performed again by the SCADA system 100.

The integrated AC-DC system is considered to be secure and reliable if there are no over or under voltage conditions at any of the buses and no over currents in any of the transmission lines, at the present operating points as well as for worst case contingencies. The integrated AC-DC system is also considered secure and reliable if in addition to the above constraints, the system remains stable for small signal perturbations. Also, the vector $\Delta S_{GOOD}$ can be calculated with or without considering contingency scenarios. In one embodiment, a vector $\Delta S_{GOOD}$ is calculated for each different contingency condition in the HVDC power system 102 or the AC networks 100 under consideration. The $\Delta P/Q$ set point candidates included in each of the $\Delta S_{GOOD}$ vectors excludes the P/Q set point candidates ($P_{BAD}/Q_{BAD}$) which violate an operating constraint imposed on the AC power system under the corresponding contingency condition.

The vector $\Delta S$ can be perceived as a point in the 2N dimensional space, where each of the dimensions represents one of the elements of the vector $\Delta S$. Mathematically the P/Q candidate analyzer 124 finds the set of points in the 2N dimensional space which if equal to $\Delta S$ does not compromise the security of the integrated AC-DC system. As part of this process, the P/Q candidate analyzer 124 assumes that the current system with the converter stations 104 at state S is secure. The origin of the 2N dimensional space is thus considered to be a secure point. The problem solved by the P/Q candidate analyzer 124 is essentially a non-linear search, and can be solved by techniques such as the Particle Swarm Optimization (PSO), Genetic Algorithm (GA), or similar multi-agent search techniques. Irrespective of the actual algorithm chosen, an embodiment of the overall methodology of the P/Q candidate analyzer 124 is described next with the aid of FIG. 6.

Figure 6:
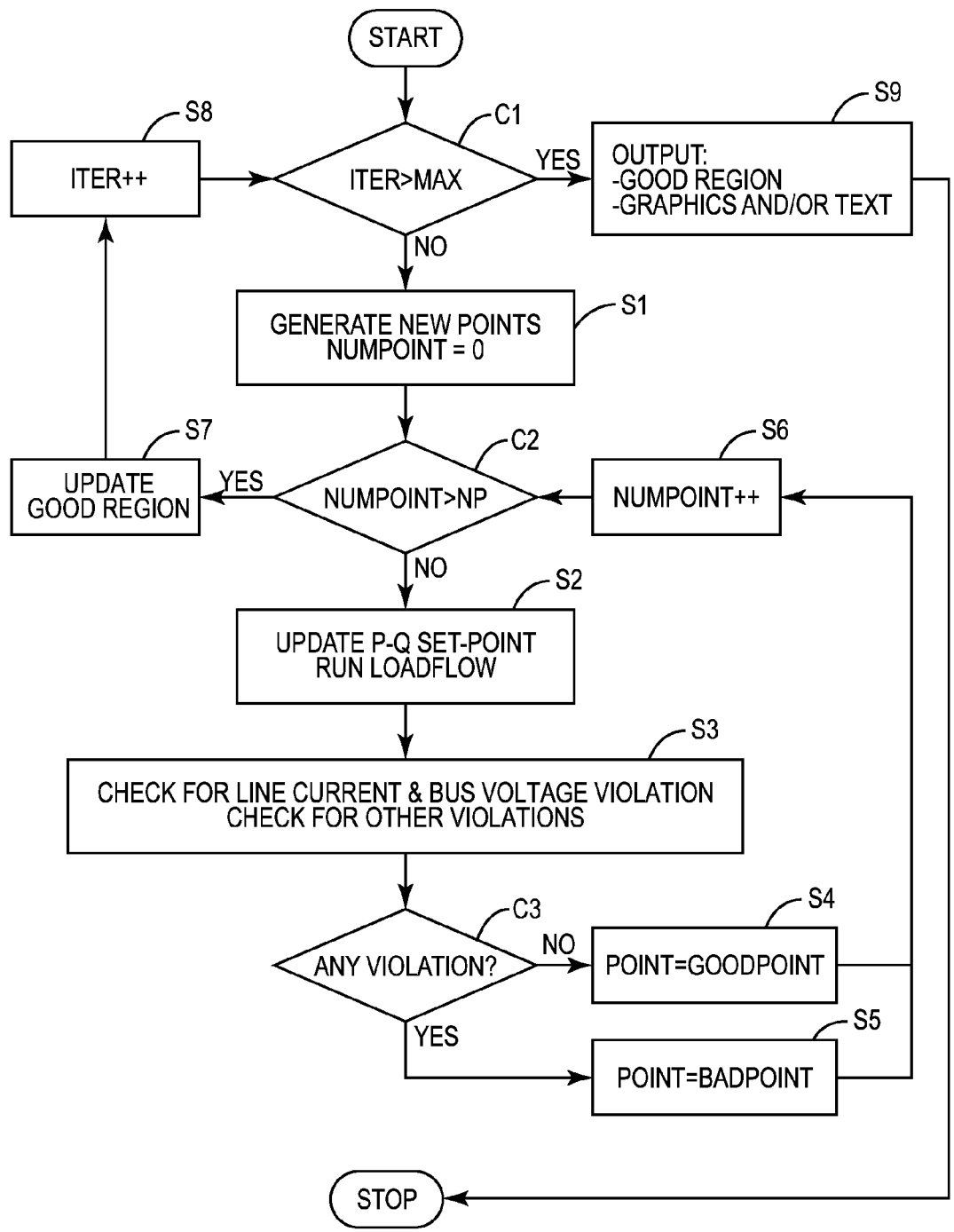
FIG. 6 illustrates a flow diagram of an embodiment of a method of determining a good region of P/Q set point candidates for converter stations.

In FIG. 6 an iterative method for determining the good region $R\{P_{GOOD}, Q_{GOOD}\}$ of valid P/Q set point candidates for the converter stations 104 is provided, where 'Max' is the maximum number of iterations to be performed, 'Iter' is the number of iterations completed, 'NP' is the number of P/Q set point candidates generated in each iteration, and 'NumPoint' is the number of P/Q set point candidates evaluated. Each generated P/Q set point candidate represents a new combination of P/Q set points for the converter stations 104. Hence in each iteration, a total of NP loadflow simulations is performed. As described previously, all points within the region R are considered to be valid P/Q set point candidates. The method of choosing the candidates for evaluation can be stochastic, if methods such as PSO are used, or can be a deterministic brute-force approach. Multi-agent, directional search techniques such as the PSO method should have a lower computation requirement than deterministic search methods. The region $\Delta S_{GOOD}$ is chosen depending on the cluster of good points obtained over multiple iterations.

The iterative method includes setting the iteration count Iter to zero (Block 'Start'). The P/Q candidate analyzer 124 checks if Iter is greater than the maximum number of iterations Max (Block C1). If Iter≤Max, the P/Q candidate analyzer 124 generates NP number of new P/Q set point candidates for loadflow evaluation and sets NumPoint to zero (Block S1). Next, the P/Q candidate analyzer 124 checks if NumPoint is greater than NP (Block C2). If NumPoint>NP, the good region R of P/Q set point candidates is updated accordingly (Block S7). Otherwise, the P/Q candidate analyzer 124 simulates an update to the P/Q set points of the converter stations 104 for the present candidate and runs the loadflow simulation for the updated system model (Block S2). The P/Q candidate analyzer 124 then checks for any violations, including, but not limited to, line current and bus voltage violations (Blocks S3 and C3). If there are any violations, the corresponding P/Q set point candidate that caused the violation is identified as a bad or invalid point that should be excluded from the good region R (Block S5). Otherwise, that candidate is indicated as a valid or good point that should be included in the good region R (Block S4). The P/Q candidate analyzer 124 then increases the value of NumPoint by one (Blocks S6 and C2), updates the good region R accordingly (Block S7), and increments the value of Iter by one (Block S8). This process continues until Iter>Max (Block C1) or other stopping criteria is satisfied. The good region R of P/Q set point candidates is finally determined at this point, output to the HLC 116 and displayed visually and/or provided in text (Block S9) and the iterative process stops (Block 'Stop').

A simplification of the method illustrated in FIG. 6 can be achieved by assuming that the good region R{$P_{GOOD}$/$Q_{GOOD}$} of valid P/Q set point candidates is convex. In this case, the convex hull $C_{GOOD}$ of the good candidates may be used to define the region R.

Figure 7:
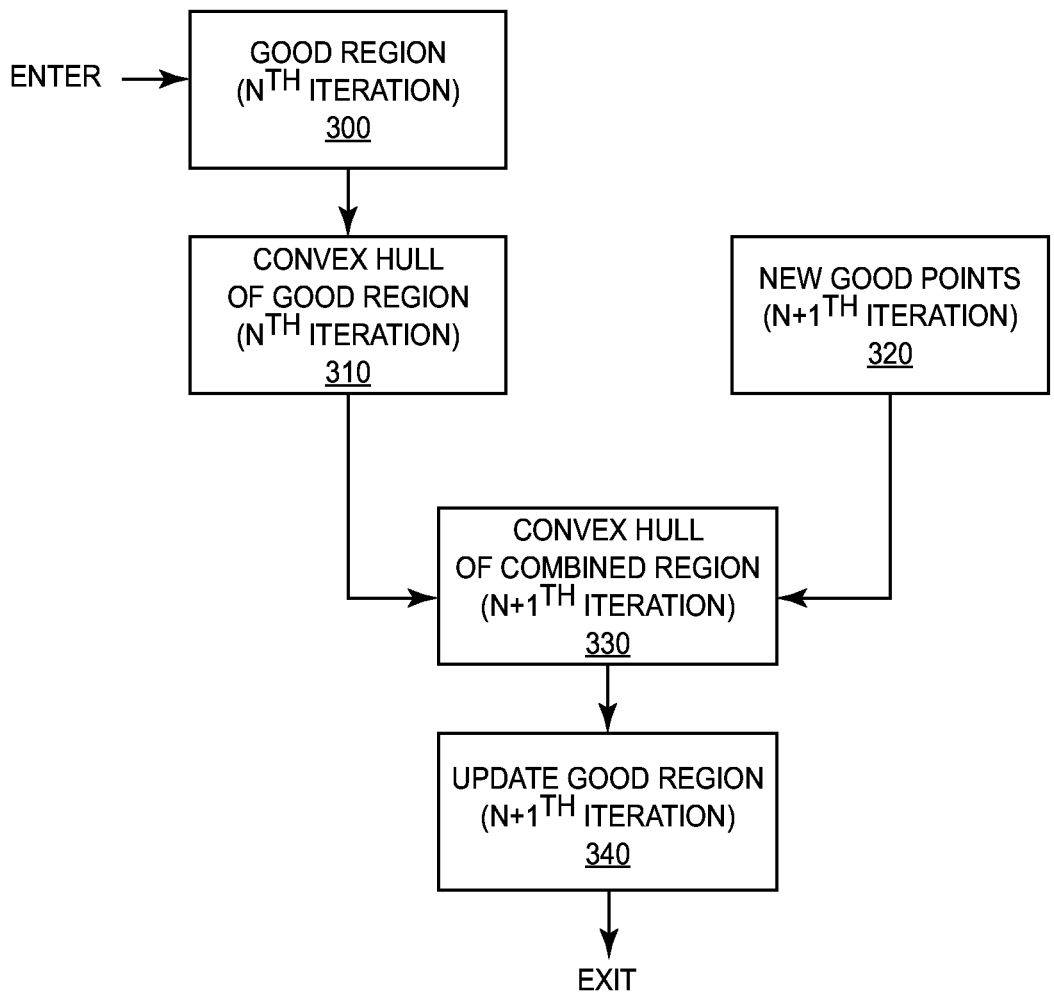
FIG. 7 illustrates a flow diagram of an embodiment of a method of determining the convex hall of a good region of P/Q set point candidates for converter stations.

FIG. 7 illustrates an embodiment of the convex hull simplification. In each iteration, a number of P/Q set point candidates are tested to see if they are good (Block 300). The good candidates are used to update the convex hull $C_{GOOD}$ (Block 310). At the end of each iteration, new P/Q set point candidates are chosen and evaluated in the next iteration (Block 320). The choice of new candidates can be made stochastically. The new good candidates are used to update the convex hull $C_{GOOD}$ from the immediately preceding iteration (Block 330). The good region R{$P_{GOOD}$/$Q_{GOOD}$} of valid P/Q set point candidates is then updated based on the new convex hull $C_{GOOD}$ (Block 340). Greater preference can be given to the P/Q set point candidates near the boundary of $C_{GOOD}$, while lower preference can be given to the candidates inside $C_{GOOD}$ or which are too far away from $C_{GOOD}$.

Figure 8A:
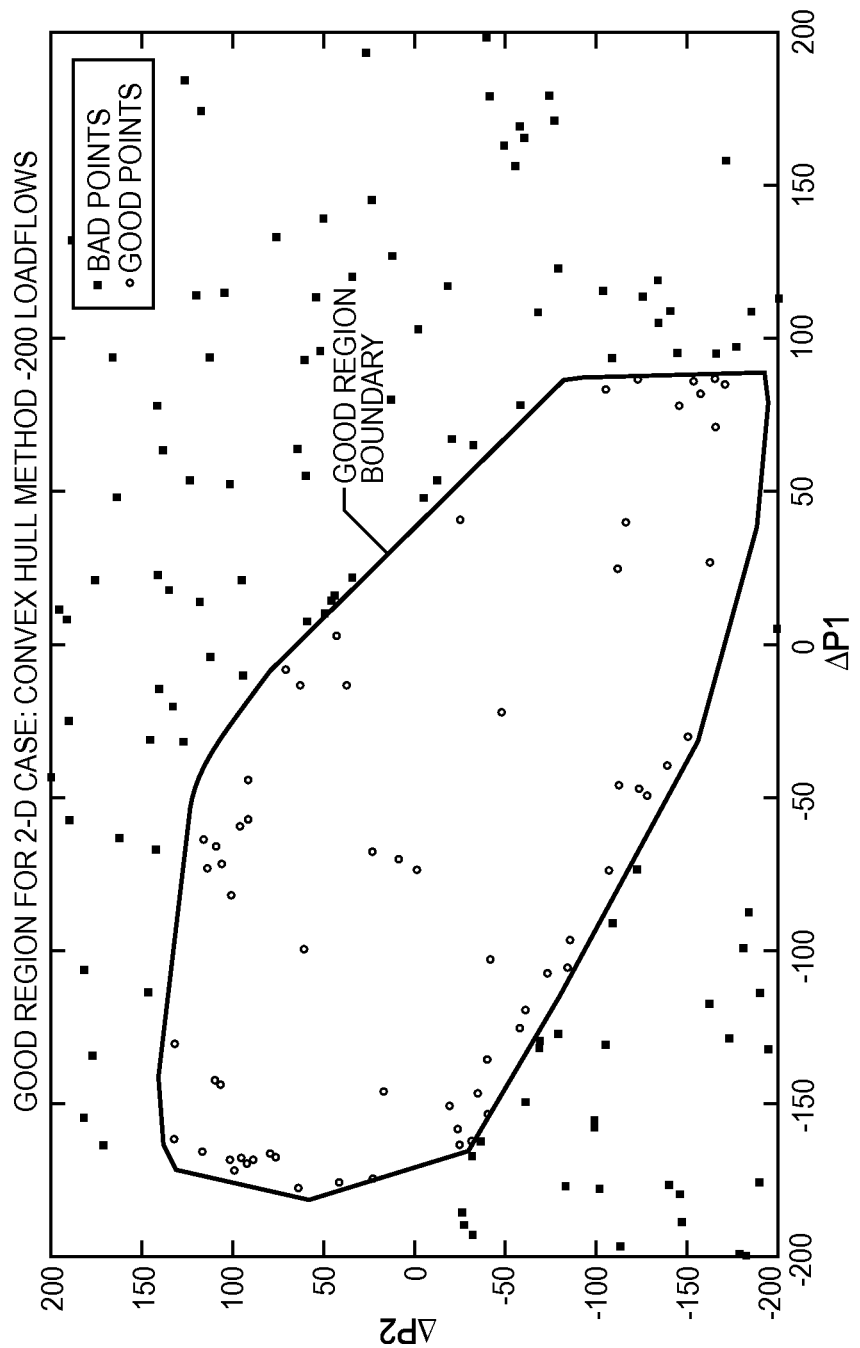
FIGS. 8A through 8C illustrate respective two-dimensional plot diagrams of the convex hall of a good region of P-Q set point candidates for two converter stations, for different numbers of loadflow simulations.
Figure 8B:
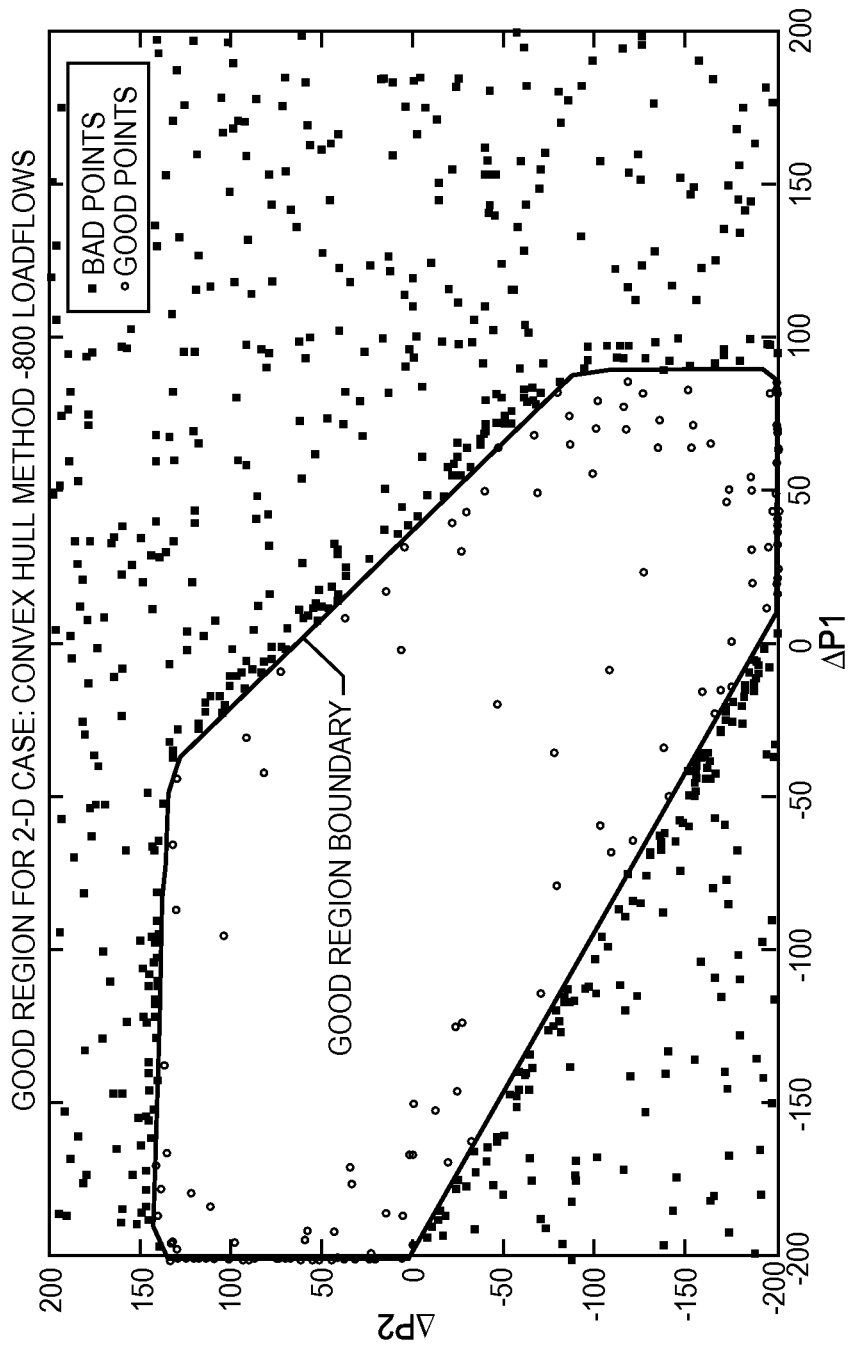
Figure 8C:
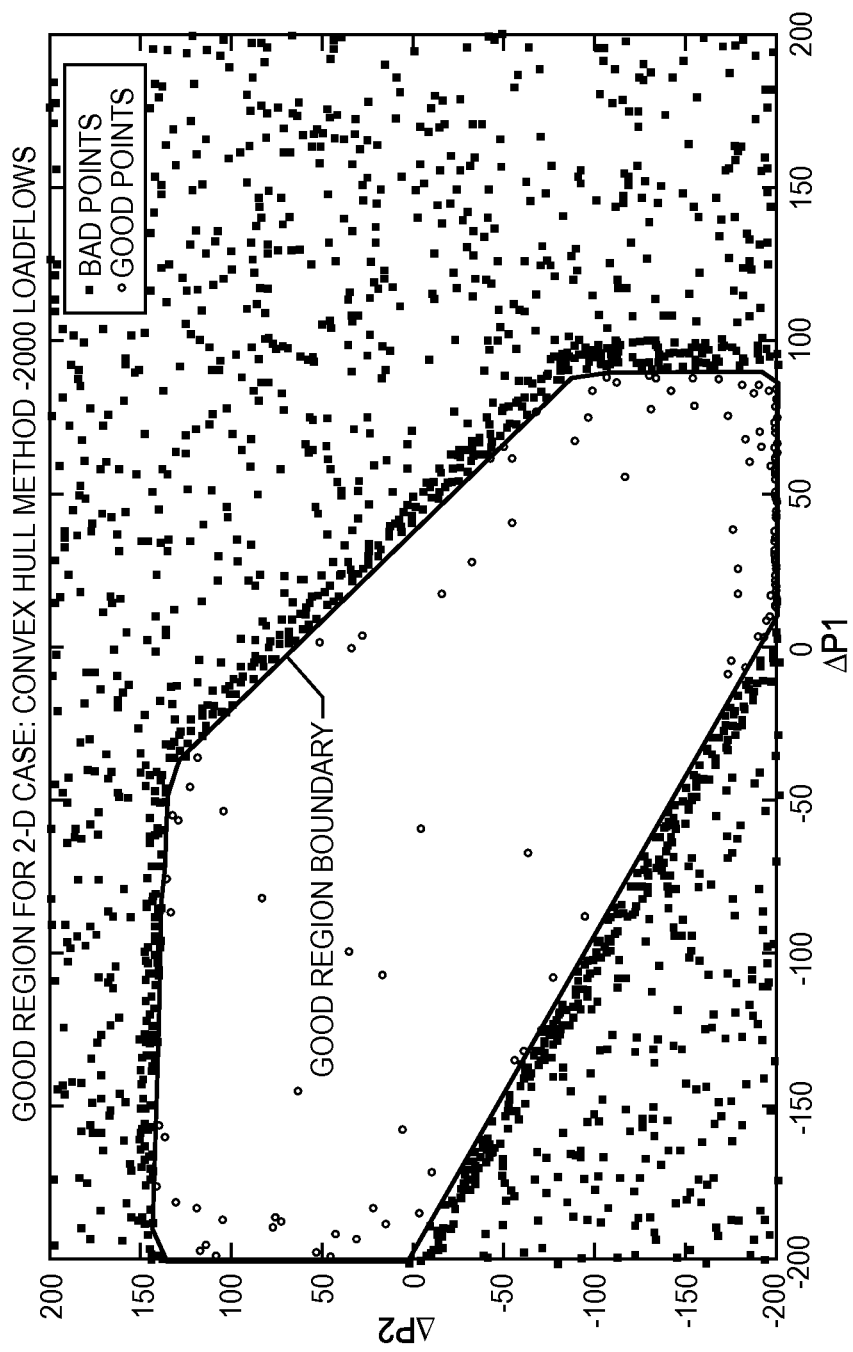

FIGS. 8A through 8C illustrate the good region R{$P_{GOOD}$, $Q_{GOOD}$} of valid P/Q set point candidates for two converter stations 104 (i.e. the two-dimensional case where N=2) for different numbers of loadflow simulations, as determined by the power set point analysis system 120 using the convex hull method. FIG. 8A shows the resulting convex hall boundary after 200 loadflow simulations, FIG. 8B shows the convex hall boundary after 800 loadflow simulations, and FIG. 8C shows the convex hall boundary after 2000 loadflow simulations.

The power set point analysis system 120 identifies which of the P/Q set point candidates violate an operating constraint imposed on the AC power system by performing several loadflow simulations before the main loadflow analysis is performed again by the SCADA system 118. Each of the loadflow simulations is performed by varying the converter station P/Q set points in accordance with a different combination of the available P/Q set point candidates. Each combination of the P/Q set point candidates that results in one of a loadflow simulation violating an operating constraint imposed on the AC power system is identified as bad or invalid ($P_{BAD}$/$Q_{BAD}$) and excluded from the good region R{$P_{GOOD}$/$Q_{GOOD}$} of valid P/Q set point candidates. The good or valid ($P_{GOOD}$/$Q_{GOOD}$) P/Q set point candidates included in the good region R determine the convex hull.

For the two-dimensional case where N=2, it is assumed that the real power ($P_1$, $P_2$) of only two converter stations 104 can be changed within e.g. ±200 MW of the initial set points determined by the SCADA system 118. As the number of loadflow simulations increase, the area of the discovered good region R also increases. However, after about 800 loadflow simulations, the good region R almost has the same convex hall boundary as after 2000 loadflow simulations. In other words, the rate of discovery of the convex hall boundary is initially very high, but eventually flattens out, indicating that most of the good region has already been discovered. Assuming only integer values of $\Delta P_1$ and $\Delta P_2$, the brute force method requires 160 k iterations to solve the same problem. However, using the convex hull method, most of the good region R is discovered by using only a few hundred loadflow simulations, making the convex hall method computationally very efficient.

In general with regard to the convex hull method, a shape or set is convex if for any two points that are part of the shape, the whole connecting line segment is also part of the shape. For any subset of the plane (set of points, rectangle, simple polygon), the corresponding convex hull is the smallest convex set that contains that subset. Mathematically, the convex hull of a set of points S in n dimensions is the intersection of all convex sets containing S. For N points $p_1$, $p_2$, . . . , $p_N$, the convex hull is then given by:

$$C \equiv \left\{ \sum_{j=1}^{N} \lambda_j p_j : \lambda_j \geq 0 \text{ for all } j \text{ and } \sum_{j=1}^{N} \lambda_j = 1 \right\}. \quad (1)$$

The P/Q candidate set point identification embodiments described use loadflow simulations to identify which changes in the converter station P/Q set points are allowable and which ones are not. If a change in a particular P/Q set point causes a violation of any AC limits of the corresponding AC network 100, then that P/Q set point candidate change is not allowed and excluded from the good region R. Typical AC limits for determining the validity or invalidity of the P/Q set point candidates can be thermal limits, typically of transmission lines and transformers, and voltage limits of bus voltages. By doing several loadflow simulations of the HVDC system 102, several allowable P/Q set point changes and several unallowable changes can be identified. The convex hull methodology is used to group together all of the allowable changes. This group of allowable changes is referred to herein as 'good region R'.

Figure 9A:
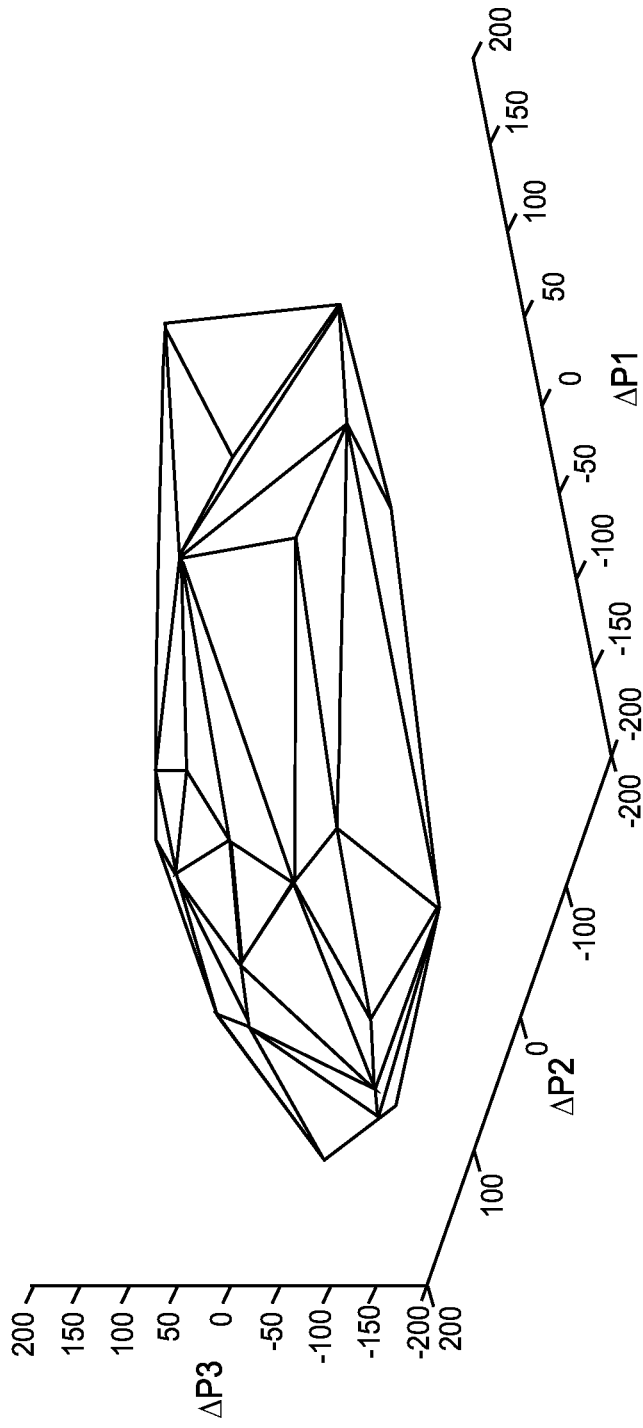
FIGS. 9A through 9C illustrate respective three-dimensional plot diagrams of the convex hall of a good region of P-Q set point candidates for three converter stations, for different numbers of loadflow simulations.
Figure 9B:
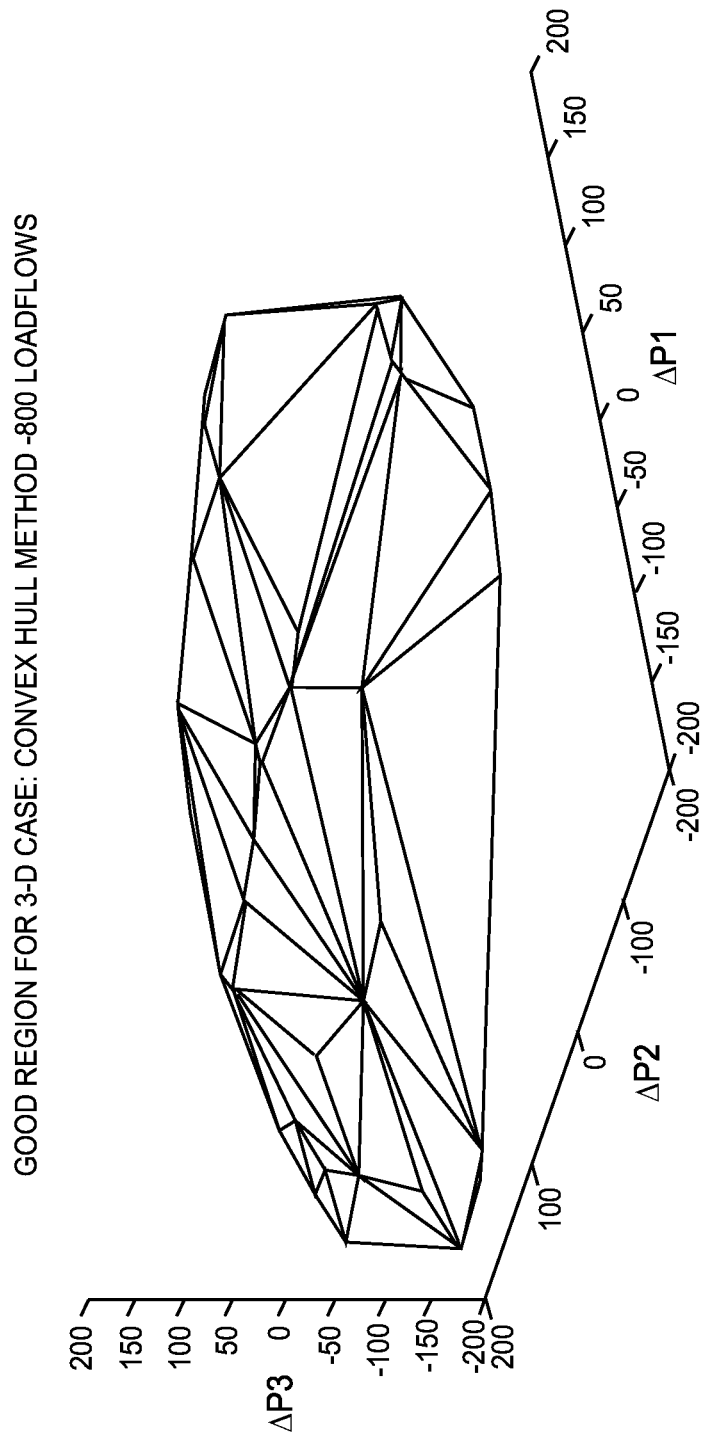
Figure 9C:
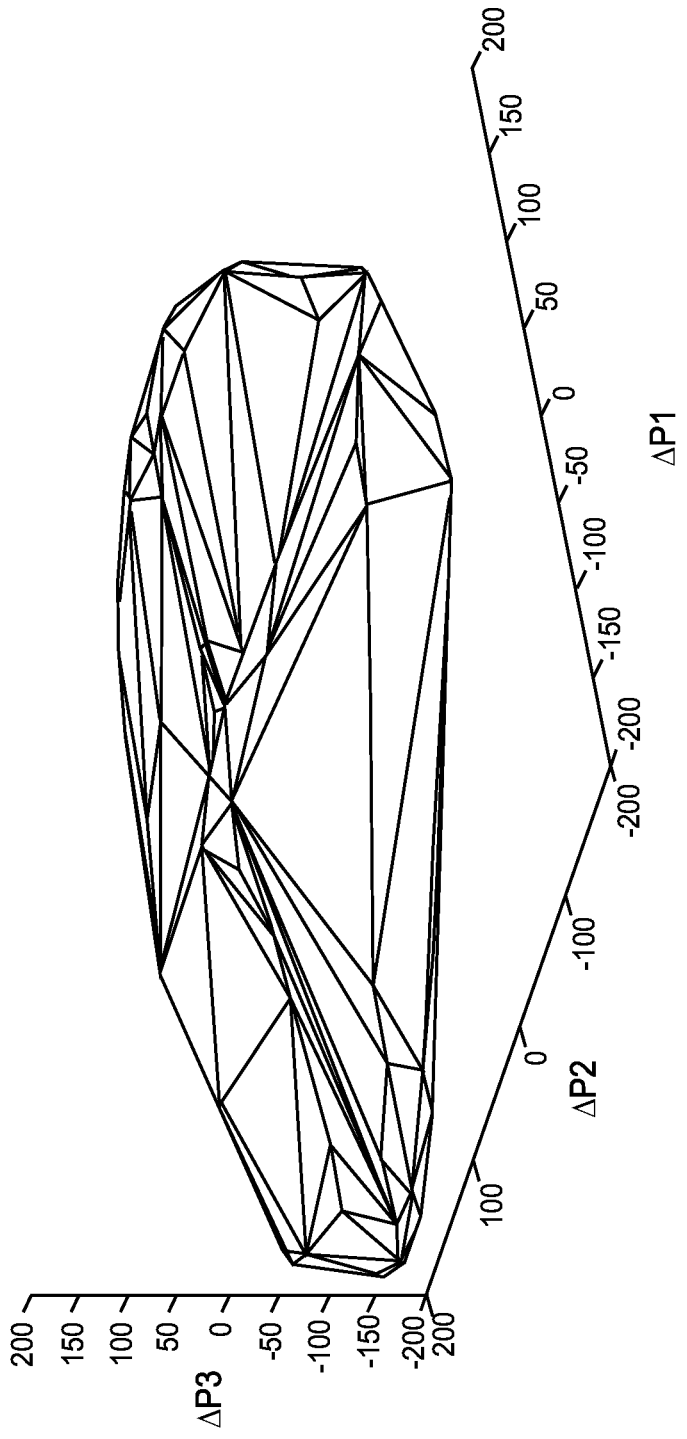

FIGS. 9A through 9C illustrate the good region R{$P_{GOOD}$/$Q_{GOOD}$} of valid P/Q set point candidates for three converter stations 104 i.e. the three-dimensional case where N=3 for different numbers of loadflow simulations, as determined by the power set point analysis system 120 using the convex hull method. FIG. 9A shows the resulting convex hall boundary after 200 loadflow simulations, FIG. 9B shows the convex hall boundary after 800 loadflow simulations, and FIG. 9C shows the convex hall boundary after 4000 loadflow simulations. A significant computational advantage is also seen in the three-dimensional case. Assuming only integer values of $\Delta P_1$, $\Delta P_2$, $\Delta P_3$, by brute force method, the problem would have taken 64 million loadflow simulations. However using the convex hull method, more than 93% of the good region R can be discovered within 800 loadflow simulations. About 100% of the good region R can be discovered within 4000 iterations.

In general, the power set point analysis system 120 provides the HLC 116 with a good region R{$P_{GOOD}$/$Q_{GOOD}$} of valid P/Q set point candidates from which appropriate $\Delta P$-$\Delta Q$ set points of the converter stations 104 can be chosen. The good region R ensures secure operation even under contingency scenarios. As such, the HLC 116 can change the operating point of one or more converter stations 104 and realize certain objectives. The objectives realized by the HLC 116 may include, but are not limited to, achieving better network stability, lowering system losses, avoiding or alleviating thermal overloading of lines, maintaining voltage regulation at buses, improving network security, etc. In a broad sense, the embodiments described herein help co-ordination of a MTDC grid with an AC grid. Specifically with regard to the convex hull methods described herein, a usable approximation of the good region R can be obtained rather quickly and then successively improved using subsequent calculations.

Figure 10:
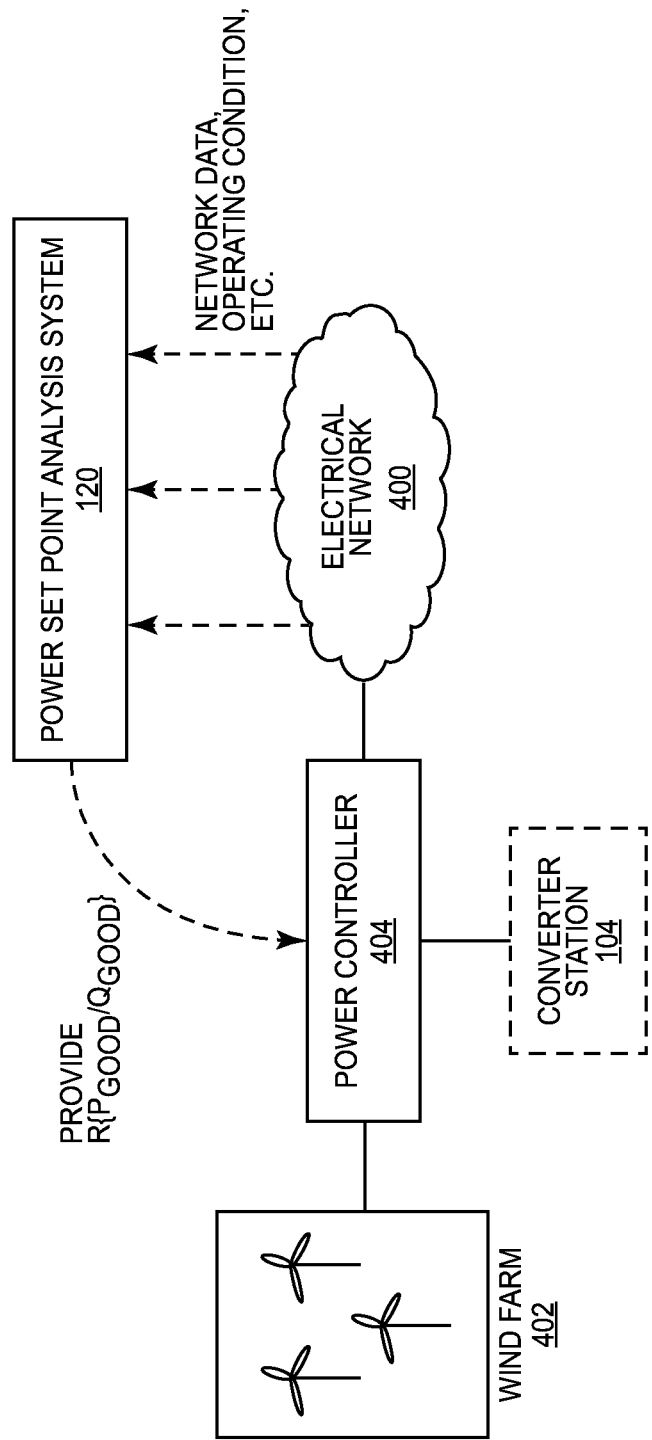
FIG. 10 illustrates a block diagram of an embodiment of an integrated power system with a power set point analysis system and an AC electrical network connected to a wind farm.

FIG. 10 illustrates another embodiment of an integrated power system where an AC electrical network 400 is connected to a wind farm 402 through a converter station 104. The converter station 104 is included in or associated with a power controller 404, and may or may not be a high voltage converter. The power controller 404 can control real and/or reactive power flowing through the converter station 104. HVDC converters are a type of power flow controller. In general, the power flow controller 404 may or may not have a converter station 104. The power set point analysis system 120 collects various data from the AC electrical network 400 such as network data, operating conditions, etc. and determines viable real and/or reactive power injections $R\{P_{GOOD}/Q_{GOOD}\}$ from these intermittent generators as previously described herein, and provides this information to the converter stations 104 for implementation between periodic loadflow analyses of the AC electrical network 400.

Figure 11:
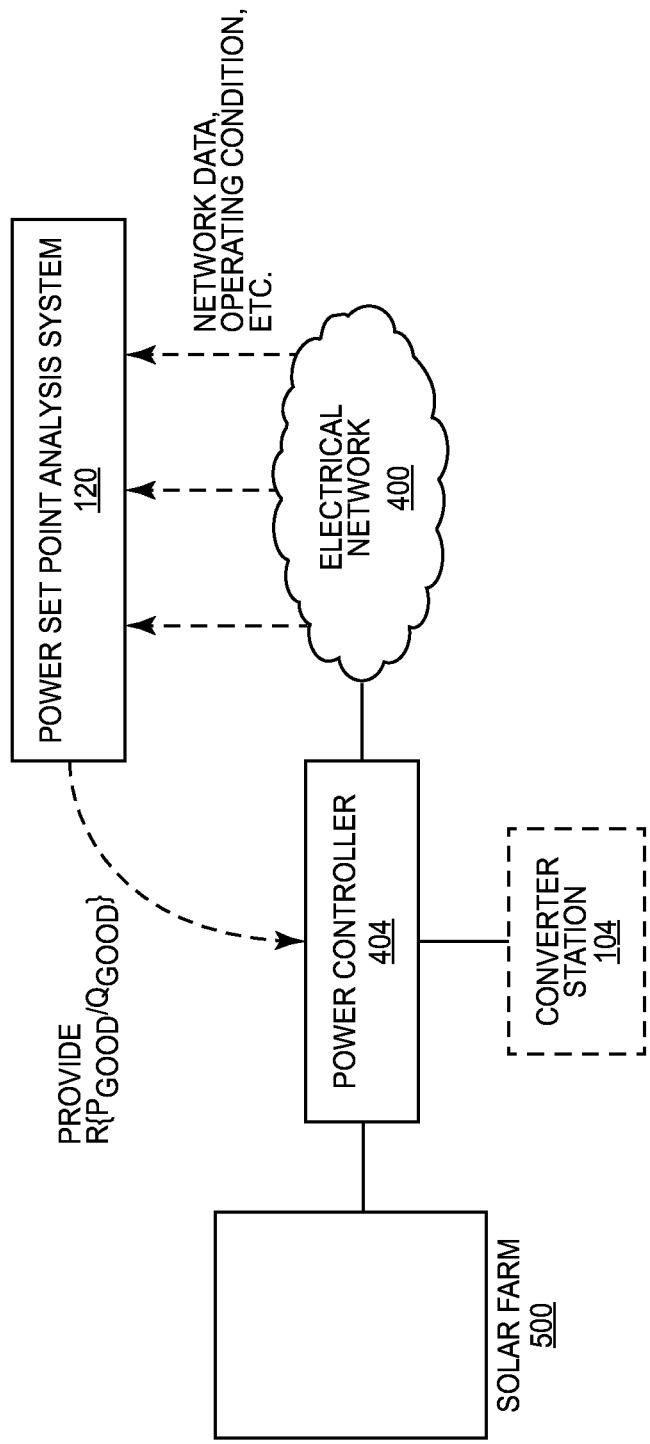
FIG. 11 illustrates a block diagram of an embodiment of an integrated power system with a power set point analysis system and an AC electrical network connected to a solar farm.

FIG. 11 illustrates yet another embodiment of an integrated power system which is similar to the embodiment shown in FIG. 10, however the DC system is a solar farm 500.

Figure 12:
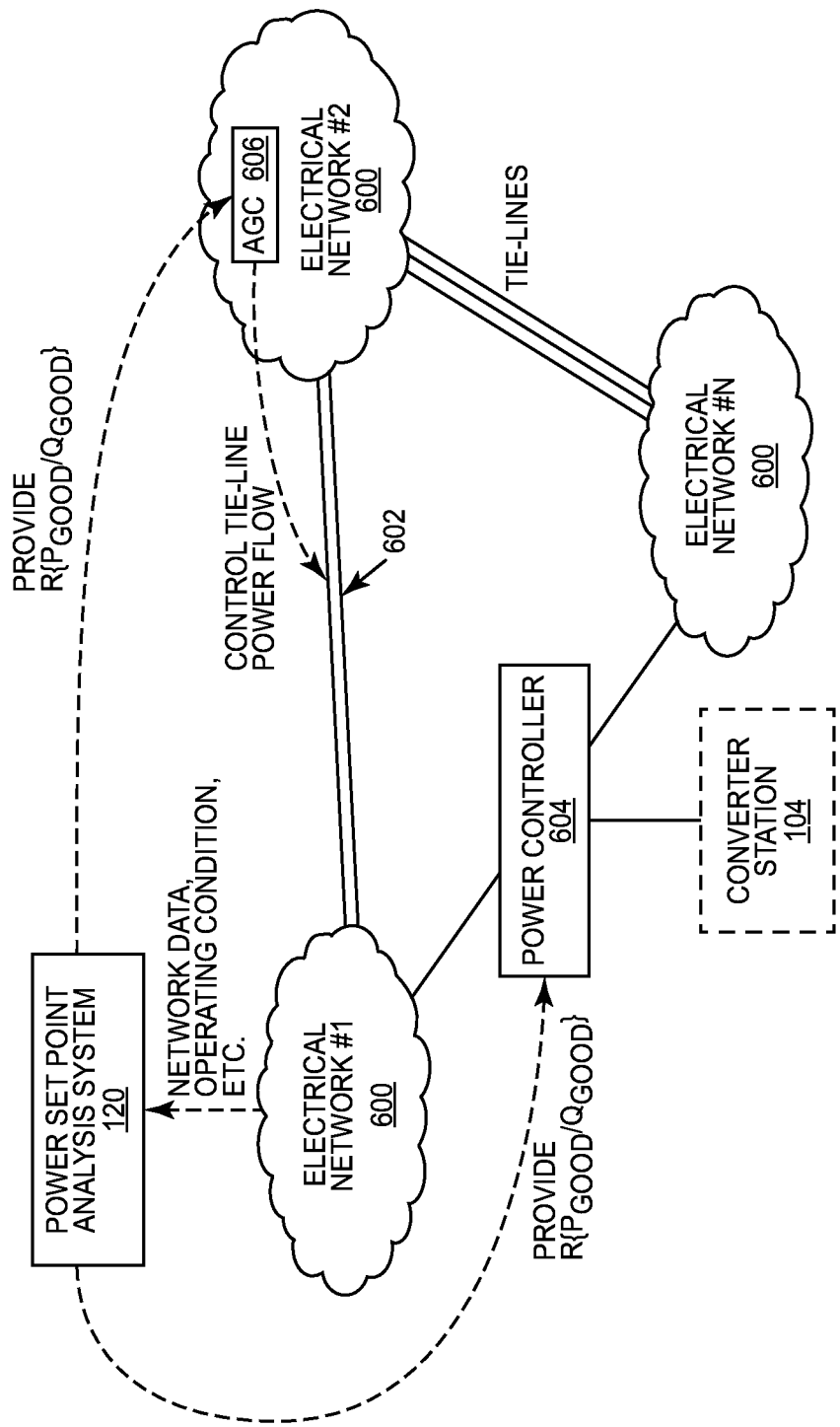
FIG. 12 illustrates a block diagram of an embodiment of an integrated power system with a power set point analysis system and AC electrical networks connected by tie-lines.

FIG. 12 illustrates still another embodiment of an integrated power system comprising AC electrical networks 600 and tie-lines 602 for connecting the different AC electrical networks 600 to one another. Some of these tie-lines 602 can have a dedicated power flow controller 604 such as a so-called back-to-back HVDC converter station', and other ones of the tie-lines 602 can be controlled by a so-called 'automatic generation control' (AGC) 606. The tie-lines 602 can inject power (real and/or reactive) from one AC electrical network 600 to another. The converter stations 104 are included in or associated with the power flow controller 604. The power set point analysis system 120 identify viable real and/or reactive power injections $R\{P_{GOOD}/Q_{GOOD}\}$ that can be provided to the tie-lines 602. In FIG. 12 for example 'Electrical Network #1' is connected to various other networks by tie-lines 602. Each network 600 may have its own SCADA system. The power set point analysis system 120 calculates what the real and/or reactive power injection limits should be for each of the tie-lines 602 as previously described herein. These limits can be provided either to the tie-line power flow controllers 604 or the AGC 606, depending on which entity is responsible for the tie-line control.

The embodiments described herein identify viable real (P) and/or reactive (Q) power limits of the converter stations 104 in an integrated power system. If the operating points of the converter stations 104 are changed by the HLC 116 with any real and/or reactive power values, from within these calculated limits, the security and reliability of the integrated power is not compromised. As such, actions taken by the HLC 116 do not adversely affect the integrated power system. Also, a stochastic-type search method can be used as previously described herein to ensure that the evaluated P/Q set points are mostly the ones which have a greater chance of being in the good region R. In addition, the P/Q set point search methodology described herein significantly lowers the computational effort compared to non-directed search methods such as the brute force method.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of identifying viable real and/or reactive power set points for converter stations connecting a first power system to an AC second power system, the converter stations each having a real and reactive power set point initially determined as part of a main loadflow analysis periodically performed on the AC power system, the method comprising:
calculating real and/or reactive power set point candidates for each of the converter stations before the main loadflow analysis is performed again on the AC power system, the power set point candidates calculated based on information determined as part of a previous iteration of the main loadflow analysis on the AC power system, the power set point candidates further being calculated between periods of the main loadflow analysis;
identifying which of the power set point candidates violate an operating constraint imposed on the AC power system;
defining a region of valid power set points for the converter stations that excludes the power set point candidates which violate an operating constraint imposed on the AC power system; and
changing the real and/or reactive power set points for the converter stations to correspond to one of the power set point candidates in the region between periods of the main loadflow analysis and before performing another main loadflow analysis.

2. The method of claim 1, wherein calculating the power set point candidates for the converter stations comprises:
determining different changes in the power set points for each of the converter stations; and
adding each of the different changes to the corresponding power set points for each of the converter stations to form a plurality of vectors of power set point candidates, each of the vectors including a different combination of power set point candidates for each of the converter stations.

3. The method of claim 2, wherein defining the region of valid power set points for the converter stations comprises determining a convex hull that excludes the vectors of power set point candidates that result in a violation of an operating constraint imposed on the AC power system.

4. The method of claim 1, wherein the region of valid power set points for the converter stations is defined responsive to a triggering event.

5. The method of claim 1, wherein the region of valid power set points for the converter stations is redefined more than one time before the main loadflow analysis is performed again on the AC power system.

6. The method of claim 1, wherein defining the region of valid power set points for the converter stations comprises determining a convex hull that excludes the power set point candidates that violate an operating constraint imposed on the AC power system.

7. The method of claim 1, wherein identifying which of the power set point candidates violate an operating constraint imposed on the AC power system comprises:
performing a plurality of loadflow simulations before the main loadflow analysis is performed again on the AC power system, each of the loadflow simulations being performed by varying the converter station set points in accordance with a different combination of the power set point candidates; and
identifying each combination of the power set point candidates that results in one of the loadflow simulations violating an operating constraint imposed on the AC power system.

8. The method of claim 7, wherein the region of valid power set points for the converter stations is defined by excluding each combination of the power set point candidates that results in one of the loadflow simulations violating an operating constraint imposed on the AC power system.

9. The method of claim 7, wherein defining the region of valid power set points for the converter stations comprises determining a convex hull that excludes each combination of the power set point candidates that results in one of the loadflow simulations violating an operating constraint imposed on the AC power system.

10. The method of claim 1, further comprising changing the set points of the converter stations to a combination of the power set point candidates included in the region of valid power set points for the converter stations, before the main loadflow analysis is performed again on the AC power system.

11. The method of claim 1, further comprising defining one or more additional regions of valid power set points for the converter stations, each of the one or more additional regions of valid power set points being defined for a different contingency condition in either of the power systems and excluding the power set point candidates which violate an operating constraint imposed on the AC power system under the contingency condition.

12. A power flow analysis system for identifying viable real and/or reactive power set points for converter stations connecting a first power system to an AC second power system, the converter stations each having a real and reactive power set point initially determined as part of a main loadflow analysis periodically performed on the AC power system, the power flow analysis system comprising a processing circuit operable to:
calculate real and/or reactive power set point candidates for each of the converter stations before the main loadflow analysis is performed again on the AC power system, the power set point candidates calculated based on information determined as part of a previous iteration of the main loadflow analysis on the AC power system, the power set point candidates further being calculated between periods of the main loadflow analysis;
identify which of the plurality power set point candidates violate an operating constraint imposed on the AC power system;
define a region of valid power set points for the converter stations that excludes the power set point candidates which violate an operating constraint imposed on the AC power system; and
changing the real and/or reactive power set points for each of the converter stations to correspond to one of the power set point candidates in the region between periods of the main loadflow analysis and before performing another main loadflow analysis.

13. The power flow analysis system of claim 12, wherein the power flow analysis system is included in a supervisory control and data acquisition system operable to perform the main loadflow analysis on the AC power system, and wherein the power flow analysis system is operable to communicate the region of valid power set points for the converter stations to a high level controller operable to change the set points of the converter stations by selecting a combination of the power set point candidates within the region of valid power set points communicated from the power flow analysis system, before the main loadflow analysis is performed again by the supervisory control and data acquisition system on the AC power system.

14. The power flow analysis system of claim 12, wherein the first power system is an HVDC power system.

15. The power flow analysis system of claim 12, wherein the first power system is a wind or solar farm and the AC power system is an AC electrical network.

16. The power flow analysis system of claim 12, wherein the AC power system includes AC electrical networks and the second power system includes tie-lines for connecting the AC electrical networks.

17. The power flow analysis system of claim 12, wherein the processing circuit is operable to calculate the power set point candidates for the converter stations by:
determining different changes in the power set points for each of the converter stations; and
adding each of the different changes to the corresponding power set points for each of the converter stations to form a plurality of vectors of power set point candidates, each of the vectors including a different combination of power set point candidates for each of the converter stations.

18. The power flow analysis system of claim 17, wherein the processing circuit is operable to define the region of valid power set points for the converter stations by determining a convex hull that excludes the vectors of power set point candidates that result in a violation of an operating constraint imposed on the AC power system.

19. The power flow analysis system of claim 12, wherein the processing circuit is operable to define the region of valid power set points for the converter stations by determining a convex hull that excludes the power set point candidates that violate an operating constraint imposed on the AC power system.

20. The power flow analysis system of claim 12, wherein the processing circuit is operable to identify which of the power set point candidates violate an operating constraint imposed on the AC power system by:
performing a plurality of loadflow simulations before the main loadflow analysis is performed again on the AC power system, each of the loadflow simulations being performed by varying the converter station set points in accordance with a different combination of the power set point candidates; and identifying each combination of the power set point candidates that results in one of the loadflow simulations violating an operating constraint imposed on the AC power system.

21. The power flow analysis system of claim 20, wherein the processing circuit is operable to define the region of valid power set points for the converter stations by excluding each combination of the power set point candidates that results in one of the loadflow simulations violating an operating constraint imposed on the AC power system.

22. The power flow analysis system of claim 20, wherein the processing circuit is operable to define the region of valid power set points for the converter stations by determining a convex hull that excludes each combination of the power set point candidates that results in one of the loadflow simulations violating an operating constraint imposed on the AC power system.

23. The power flow analysis system of claim 12, wherein the processing circuit is further operable to define one or more additional regions of valid power set points for the converter stations, each of the one or more additional regions of valid power set points being defined for a different contingency condition in either of the power systems and excluding the power set point candidates which violate an operating constraint imposed on the AC power system under the contingency condition.

24. A non-transitory computer readable medium storing a computer program operable to identify viable real and/or reactive power set points for converter stations connecting a first power system to an AC second power system, the converter stations each having a real and reactive power set point initially determined as part of a main loadflow analysis periodically performed on the AC power system, the computer program comprising:
 program instructions to calculate real and/or reactive power set point candidates for each of the converter stations before the main loadflow analysis is performed again on the power systems, the power set point candidates calculated based on information determined as part of a previous iteration of the main loadflow analysis on the AC power system, the power set point candidates further being calculated between periods of the main loadflow analysis;
 program instructions to identify which of the plurality of power set point candidates violate an operating constraint imposed on the AC power system;
 program instructions to define a region of valid power set points for the converter stations that excludes the power set point candidates which violate an operating constraint imposed on the AC power system; and
 changing the real and/or reactive power set points for the converter stations to correspond to one of the power set point candidates in the region between periods of the main loadflow analysis and before performing another main loadflow analysis.

* * * * *